Sept. 13, 1927.

J. W. HULL

LIQUID LEVEL GAUGE

Filed July 10, 1924

1,642,656

Inventor

J. W. Hull

By

Lacy & Lacy, Attorneys

Patented Sept. 13, 1927.

1,642,656

UNITED STATES PATENT OFFICE.

JOHN W. HULL, OF SAN ANTONIO, TEXAS, ASSIGNOR OF ONE-HALF TO JAMES RIGGS, OF SAN ANTONIO, TEXAS.

LIQUID-LEVEL GAUGE.

Application filed July 10, 1924. Serial No. 725,161.

This invention relates to an improved liquid level gauge particularly designed for use upon underground tanks and seeks, among other objects, to provide a means whereby the amount of liquid put into a tank as well as the amount of liquid drawn from the tank may be readily determined.

The invention further seeks to provide a gauge especially applicable for use in conjunction with underground gasoline tanks, and by the aid of which an accurate record of the amount of gasoline bought and sold may be kept.

And the invention still further seeks to provide a device which may be readily installed.

Other and incidental objects will appear hereinafter.

Figure 1:
Figure 2:
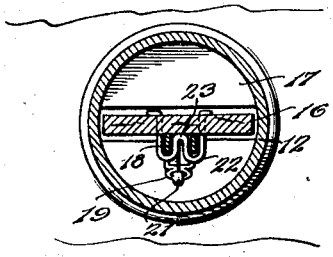
Figure 4:
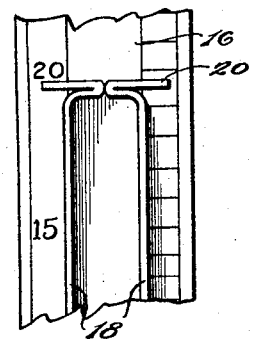
Figure 3:
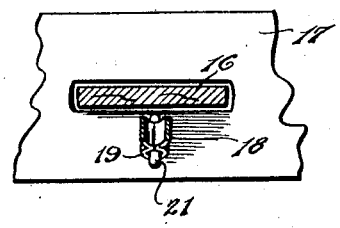
Figure 3:
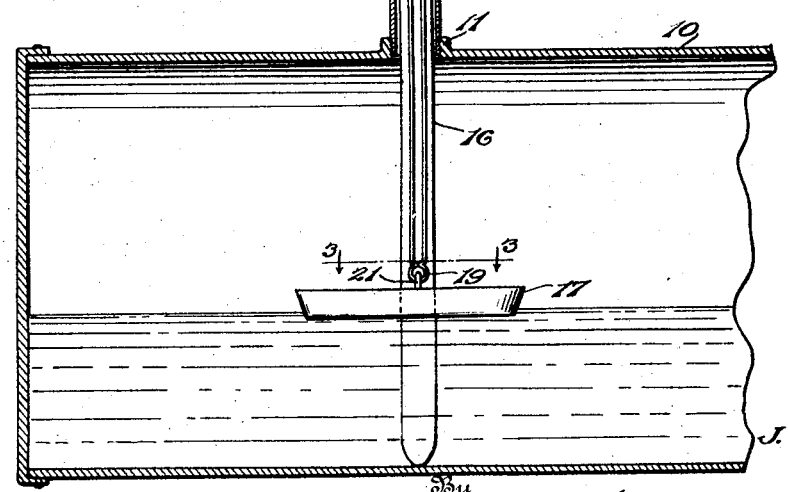

In the accompanying drawings:

Figure 1 is a view partly in section and partly in elevation, illustrating my improved gauge applied to an underground gasoline tank, Figure 2 is a transverse sectional view on the line 2—2 of Figure 1, looking in the direction of the arrows, Figure 3 is a detail sectional view on the line 3—3 of Figure 1, looking in the direction of the arrows, and Figure 4 is a fragmentary elevation particularly showing the pointers of the indicator of the device.

Referring now more particularly to the drawings, I have illustrated a conventional underground gasoline tank at 10. In accordance with the present improvements, this tank is integrally formed or otherwise provided at its upper side with a collar 11 and engaged with said collar is a tubular casing embodying a lower pipe section 12 screwed into the collar, and an upper pipe section 13 screwed into the lower section. The section 12 extends to the ground level, or a little above the ground level so that the section 13 is thus supported above the ground, in view, and screwed upon the latter section at its upper end is a closure cap 14. The section 13 has a sight opening in a side thereof which is closed by means of a glass 15.

Freely received within the pipe sections 12 and 13 is a gauge bar 16 resting at its lower end against the bottom of the tank 10. The gauge bar is of a length to extend to a point near the upper end of the section 13 and, as shown in Figure 2 of the drawings, is flat. Slidable upon the gauge bar is a float 17 slotted centrally to freely receive the gauge bar therethrough. The float may be of any approved material and connected therewith is an indicator 18. This indicating member comprises spaced rods which are connected at their lower ends by an eye 19 while at their upper ends, the rods are directed toward each other, as shown in Figure 4, into abutting relation, and are then reversely shaped to define oppositely directed pointers 20. Freely received through the eye 19 of the indicating member is a staple 21 which is engaged with the float and pivotally connects the indicating member therewith. Slidably receiving the upper end portion of the indicating member is, as shown in Figure 2, a guide staple 22. As shown, the ends of the staple are arranged to extend through the gauge bar 16 and are bent over for connecting the staple thereto while the back of the staple is bent to form a tongue 23 projecting between the spaced rods of the indicating member. The staple will thus serve to retain the indicating member close to the gauge bar while, at the same time, the indicating member may slide freely through the staple.

As shown in Figure 4, the upper end portion of the gauge bar 16 is provided at its right hand margin with graduations indicating gallons while the left hand margin is calibrated at five gallon intervals. Accordingly, as will be seen, as fuel is introduced into the tank 10, the indicating member 18 will be caused to rise by the float 17 for indicating the quantity of fuel bought while, as fuel is drawn from the tank, the member 18 will drop so that by comparative readings, the quantity of fuel bought and sold may be readily determined.

Having thus described the invention, what I claim is:

1. In combination with a tank having an opening in its top side, and a tubular casing secured to the tank in line with the opening in the top thereof, and extending upwardly therefrom and having a sight opening in a side of its upper portion, of a gauge bar housed within the tubular casing, and passing through the opening in the top of the tank and having its lower end resting on the bottom thereof, a float having an opening to receive the gauge bar upon the lower portion of which it is movably mounted to rise and fall with the change of level of the liquid in the tank, and an indicating member extending through the tubular casing and along a side of the gauge bar and connected at its lower end with the float and movable therewith.

2. A liquid level gauge comprising a tubular casing having a sight opening in a side thereof, a gauge bar within the casing projecting beyond an end thereof, a float having an opening and slidably mounted on the projecting end of the gauge bar which passes through said opening therein, an indicating member extending along a side of the gauge bar and connected at one end with the float to move therewith and having its opposite end portion extending within the casing and terminating in a pointer opposite the sight opening thereof, and guide means fast to the gauge bar for holding the indicating member thereto and directing it in its movements.

3. A liquid level gauge comprising a gauge bar, having its upper opposite edge portions calibrated, a float having an opening and slidable on the lower portion of the gauge bar which passes through said opening therein, spaced elements movable on the gauge bar and connected at their lower ends by an eye, and having their upper ends brought together, thence deflected outwardly in opposite directions to form an indicator, means loosely connecting said eye with the float, and a guide staple engaging the spaced elements and fastened to the gauge bar.

In testimony whereof I affix my signature.

JOHN W. HULL. [L. S.]